(12) United States Patent
Minami et al.

(10) Patent No.: US 10,747,294 B2
(45) Date of Patent: Aug. 18, 2020

(54) ELECTRONIC APPARATUS EFFICIENTLY CONDUCTING POWER SUPPLY CONTROL

(71) Applicant: CASIO COMPUTER CO., LTD., Shibuya-ku, Tokyo (JP)

(72) Inventors: Tsuyoshi Minami, Musashimurayama (JP); Kimiyasu Mizuno, Akishima (JP); Hideo Suzuki, Ome (JP); Takashi Suenaga, Tokyo (JP); Keiichi Nomura, Uenohara (JP); Shuhei Uchida, Hamura (JP); Munetaka Seo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 216 days.

(21) Appl. No.: 15/364,897

(22) Filed: Nov. 30, 2016

(65) Prior Publication Data

US 2017/0277248 A1 Sep. 28, 2017

(30) Foreign Application Priority Data

Mar. 23, 2016 (JP) .................................. 2016-058332

(51) Int. Cl.
*G06F 1/3287* (2019.01)
*G06F 1/3296* (2019.01)
*G06F 1/3206* (2019.01)
*H02J 9/06* (2006.01)
*G06F 1/3203* (2019.01)

(52) U.S. Cl.
CPC .......... *G06F 1/3287* (2013.01); *G06F 1/3296* (2013.01); *G06F 1/3203* (2013.01); *Y02D 10/171* (2018.01); *Y02D 50/20* (2018.01)

(58) Field of Classification Search
CPC ..... G06F 1/3287; G06F 1/3296; G06F 1/3203
See application file for complete search history.

(56) References Cited

U.S. PATENT DOCUMENTS

| 5,450,003 A | 9/1995 | Cheon | |
| 6,822,764 B1* | 11/2004 | Okabe | ............... H04M 19/08 358/442 |
| 9,229,667 B2 | 1/2016 | Takiguchi | |
| 2009/0106572 A1* | 4/2009 | Taguchi | ............... G06F 1/3203 713/322 |

(Continued)

FOREIGN PATENT DOCUMENTS

| CN | 2919318 Y | 7/2007 |
| JP | 03246710 A | 11/1991 |

(Continued)

OTHER PUBLICATIONS

Japanese Office Action dated Feb. 13, 2018 issued in counterpart Japanese Application No. 2016-058332.

(Continued)

*Primary Examiner* — Jaweed A Abbaszadeh
*Assistant Examiner* — Gayathri Sampath
(74) *Attorney, Agent, or Firm* — Holtz, Holtz & Volek PC (57) ABSTRACT

An electronic apparatus includes a main CPU, a main power supply control unit which conducts power supply to the main CPU and conducts supply control of the power, a sub power supply control unit which conducts power supply to the main power supply control unit, and a first switch which switches on and off power supply from the sub power supply control unit to the main power supply control unit.

9 Claims, 4 Drawing Sheets

(56) References Cited

U.S. PATENT DOCUMENTS

| | | | |
|---|---|---|---|
| 2009/0287945 A1* | 11/2009 | Kim | G06F 1/3228 |
| | | | 713/323 |
| 2012/0117395 A1* | 5/2012 | Akiyama | G06F 1/263 |
| | | | 713/310 |
| 2013/0067259 A1* | 3/2013 | Freiwald | G06F 1/3293 |
| | | | 713/323 |
| 2013/0191673 A1* | 7/2013 | Koyama | G06F 1/3287 |
| | | | 713/324 |

FOREIGN PATENT DOCUMENTS

| | | |
|---|---|---|
| JP | 07319590 A | 12/1995 |
| JP | 10049265 A | 2/1998 |
| JP | 2004005029 A | 1/2004 |
| JP | 2007243793 A | 9/2007 |
| JP | 2009116851 A | 5/2009 |
| JP | 2010277285 A | 12/2010 |
| JP | 2015020301 A | 2/2015 |

OTHER PUBLICATIONS

Chinese Office Action (and English language translation thereof) dated Jul. 3, 219 issued in Chinese Application No. 201710019717.4.

* cited by examiner

ELECTRONIC APPARATUS EFFICIENTLY CONDUCTING POWER SUPPLY CONTROL

CROSS-REFERENCE TO RELATED APPLICATIONS

The present application claims priority from Japanese Patent Application No. 2016-058332 filed on Mar. 23, 2016, disclosure of which is all incorporated herein.

FIELD OF THE INVENTION

The present invention relates to an electronic apparatus which efficiently conducts power supply control.

BACKGROUND OF THE INVENTION

Conventionally, power control (power management) has been conducted for appropriate power supply for the purpose of reducing power consumption or suppressing heating in an electronic apparatus, mainly a mobile apparatus. JP 2007-243793 A discloses a configuration including a power source control circuit to control power supply to each unit of a portable phone device.

SUMMARY OF THE INVENTION

According to an aspect of the present invention, there is provided an electronic apparatus including: a first processor; a first power supply control unit configured to conduct power supply to the first processor and conduct supply control of the power; a second power supply control unit configured to conduct power supply to the first power supply control unit; and a first switch configured to switch on and off power supply from the second power supply control unit to the first power supply control unit.

DETAILED DESCRIPTION OF THE PREFERRED EMBODIMENTS

In the following, an embodiment of the present invention will be described with reference to the drawings.

Figure 1:
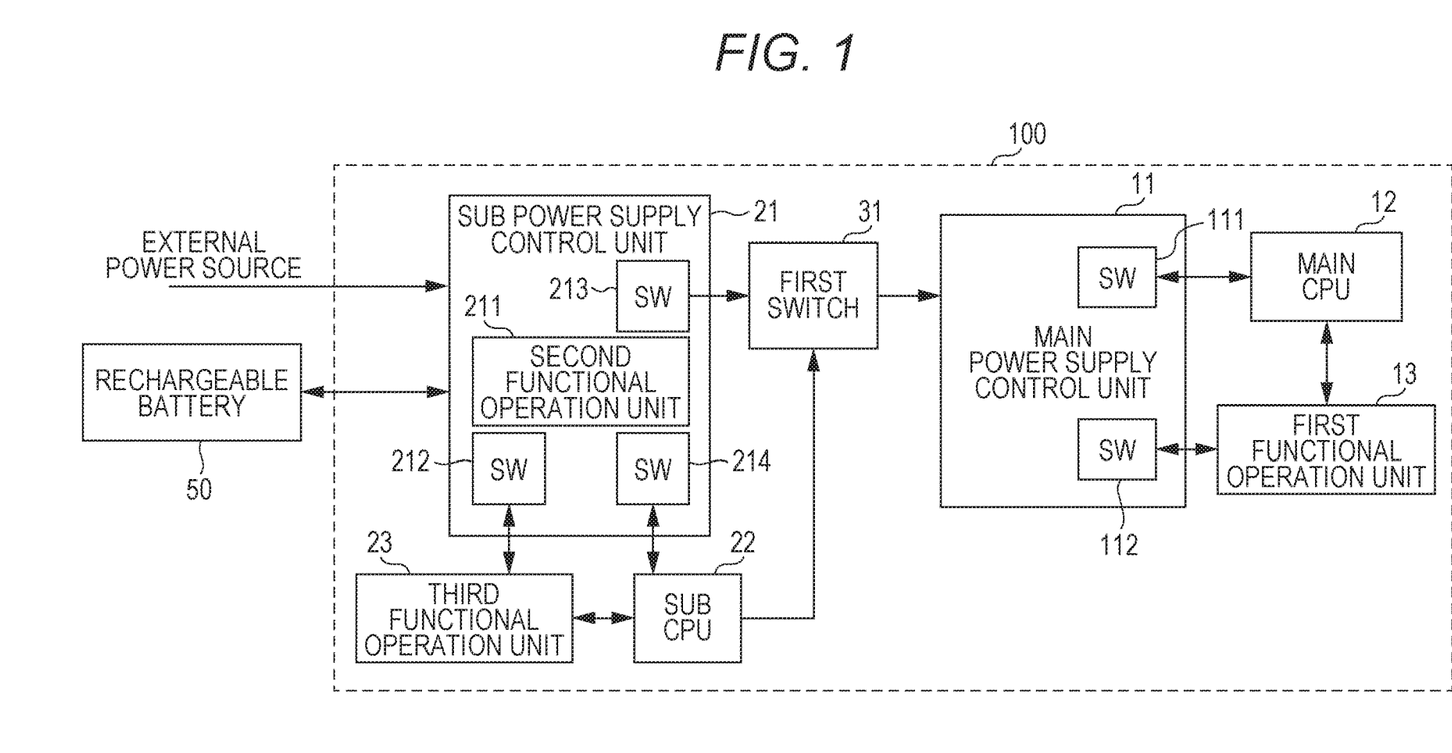
FIG. 1 is a block diagram showing a functional configuration of an electronic apparatus according to an embodiment of the present invention.

FIG. 1 is a block diagram showing a functional configuration of an electronic apparatus 100 according to an embodiment of the present invention.

The electronic apparatus 100 includes a main power supply control unit 11 (a first power supply control unit), a main CPU 12 (a first processor), a first functional operation unit 13 (a first functional operation unit), a sub power supply control unit 21 (a second power supply control unit), a sub CPU 22 (a second processor), a third functional operation unit 23, a first switch 31 (a first switch) and the like.

Additionally, the electronic apparatus 100 is capable of receiving a power supply from an external power source by wire or the like and here, a rechargeable battery 50 is also provided detachably or provided as undetachable incorporation to receive a power supply although not particularly limited.

In the electronic apparatus 100, all the power is input to the sub power supply control unit 21 and then supplied directly to a part of components and supplied to the other part of the components via the first switch 31 and the main power supply control unit 11.

A configuration in which the main power supply control unit 11 conducts power supply control includes the main CPU 12 and the first functional operation unit 13. As the main power supply control unit 11, a conventional well-known power management IC (PMIC) can be used.

The main CPU 12 conducts various kinds of arithmetic operation processing to conduct various controls related to ordinary operation of the electronic apparatus 100. The main CPU 12 conducts operation control of each unit of the first functional operation unit 13.

The first functional operation unit 13 includes a display unit, an operation receiving unit, a voice output unit, a communication unit, and a control drive unit related to various kinds of predetermined functional operations. The first functional operation unit 13 has, for example, a color liquid crystal display screen as the display unit and causes the color liquid crystal display screen to display various kinds of displays on the basis of a control signal from the main CPU 12. As the operation receiving unit, for example, a touch sensor laid on the color liquid crystal display screen is provided and used as a touch panel. As the communication unit, for example, a communication interface is provided for conducting short-distance communication such as Bluetooth (registered trademark) communication with an external apparatus. As the voice output unit, for example, a speaker is provided through which various kinds of voices are output.

In the main power supply control unit 11, switching elements 111, 112 (SW) which switch power supply/power non-supply are provided for the main CPU 12 and the first functional operation unit 13, respectively, and the switching elements 111, 112 can be switched between on and off by control operation of the main CPU 12. The switching element 111 which switches power supply/power non-supply from the main power supply control unit 11 to the main CPU 12 can be set to be on in an initial state where power is supplied to the main power supply control unit 11 to be activated. As the switching elements 111, 112 and the like, an analog switch such as a transistor is used.

The configuration in which the sub power supply control unit 21 conducts the power supply control includes the sub CPU 22 and the third functional operation unit 23.

The sub CPU 22 has lower power consumption than the main CPU 12, and a CPU having lower performance than the main CPU 12 is ordinarily used, though not particularly limited thereto. The sub CPU 22 conducts various kinds of arithmetic operation processing and controls operation of the respective units of the electronic apparatus 100 other than the main CPU 12 and the units in the configuration directly controlled by the main CPU 12. The configuration controlled by the sub CPU 22 includes the third functional operation unit 23 and the first switch 31.

The third functional operation unit 23 includes a part of the configuration required to have limited operation even under a condition where the main CPU 12 is stopped, for example, a generation unit of a buzzer sound or beep, a temperature sensor, an acceleration sensor for detecting a movement of the electronic apparatus 100, and the like. These operations of the third functional operation unit 23 are controlled by the sub CPU 22.

The first switch 31 is a switching element which switches power supply/power non-supply from the sub power supply control unit 21 to the main power supply control unit 11. Although the first switch 31 is here provided separately from and connected in series to a switching element 213 in the sub power supply control unit 21, and is controlled to be switched by the sub CPU 22, these may be replaced by a common switch. The common switch in such a case may be provided in the sub power supply control unit 21 (on an IC chip) integrally with each component related to the power supply control. Although an analog switch is used as the first switch 31, an electromagnetically controllable mechanical switch may be used.

In the sub power supply control unit 21, switching elements 212 to 214 (second switches) are provided for the sub CPU 22, the third functional operation unit 23 and the first switch 31, respectively, for switching power supply/power non-supply, which switching elements 212 to 214 can be switched between on and off by control operation of the sub CPU 22. As the switching elements 212 to 214, an analog switch can be used similarly to the switching elements 111, 112.

Additionally, in the sub power supply control unit 21, a second functional operation unit 211 (a second functional operation unit) is provided such as a voltage conversion circuit (DC/DC converter etc.) which converts power supplied from an external power source or a rechargeable battery into a voltage appropriate for each unit of a supply destination, a battery residual capacity monitoring unit which monitors residual power of the rechargeable battery 50, a protection circuit which protects each component from an overcurrent from an external power source, or the like.

Next, a power supply mode of the electronic apparatus 100 in the present embodiment will be described.

In the electronic apparatus 100, determined as power supply modes (an operation mode) are an ordinary mode in which the main CPU 12 and the sub CPU 22 cause the first functional operation unit 13 and the third functional operation unit 23 to operate without limitation, respectively, and a low power mode (a stop mode) in which the main CPU 12 is stopped and the sub CPU 22 causes the third functional operation unit 23 to operate, and according to a detected condition such as predetermined operation input by a user, an operation state of each unit, a battery residual capacity of the rechargeable battery 50, or the like, the apparatus is switched to either of the modes.

Additionally, also as a power cut-off mode, the electronic apparatus 100 can stop operation of the sub CPU 22 and the third functional operation unit 23, in addition to the main CPU 12 and the first functional operation unit 13, to suppress electric discharge of the rechargeable battery 50.

In the ordinary mode, the sub CPU 22 causes the switching element 213 directed to the first switch 31 and the first switch 31 to be turned on and the main power supply control unit 11 allows power supply to the main CPU 12, so that the activated main CPU 12 appropriately switches power supply to each unit of the first functional operation unit 13.

In the low power mode, the main power supply control unit 11 causes the switching elements 111, 112 directed to the main CPU 12 and the first functional operation unit 13 to be turned off and also the sub CPU 22 causes at least the first switch 31 to be turned off to stop operation itself of the main power supply control unit 11. The sub CPU 22 switches on and off the switching element 212 directed to each unit of the third functional operation unit 23 as required. This makes power consumption in the low power mode be smaller than power consumption in the ordinary mode.

In the power cut-off mode, with the switching element 213 directed to the first switch 31 and the switching element 212 directed to the third functional operation unit 23 being turned off, the sub CPU 22 is stopped to operate, and further, the switching element 214 directed to the sub CPU 22 is turned off. At this time, although the second functional operation unit 211 in the sub power supply control unit 21 operates, operation frequency or operation contents can be limited such that operation of the second functional operation unit 211 in an operation stopped state needs lower power consumption than that in the operation in the ordinary mode or in the low power mode.

Figure 2A:
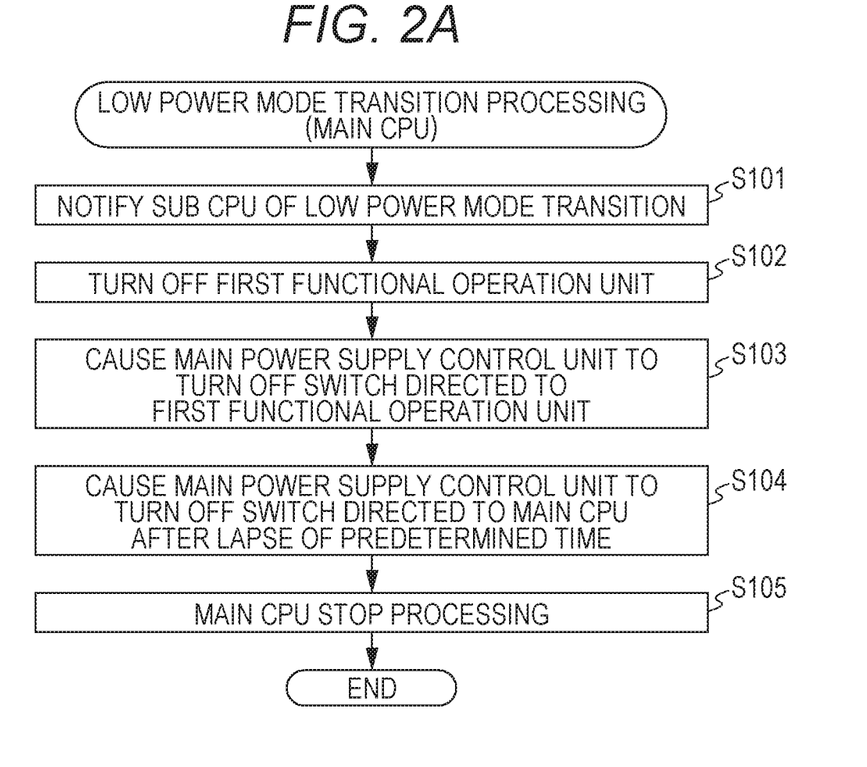
FIG. 2A is a flow chart showing a control procedure by a main CPU in low power mode transition processing.
Figure 2B:
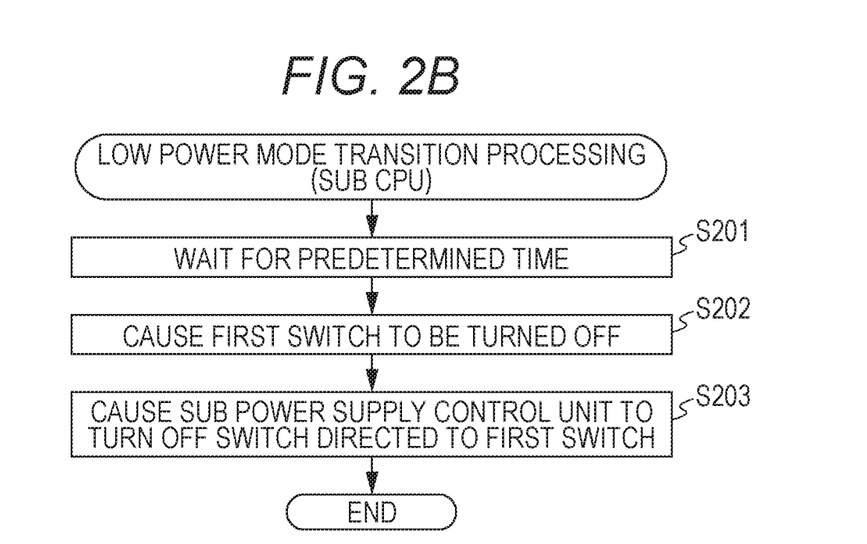
FIG. 2B is a flow chart showing a control procedure by a sub CPU in the low power mode transition processing.

FIG. 2A is a flow chart showing a control procedure by the main CPU 12 in low power mode transition processing executed in the electronic apparatus 100 of the present embodiment, and FIG. 2B is a flow chart showing a control procedure by the sub CPU 22.

The low power mode transition processing by the main CPU 12 is called up and executed when the main CPU 12 satisfies a condition for shifting to the low power mode.

As shown in FIG. 2A, the main CPU 12 notifies the sub CPU 22 of a transition to the low power mode (first stop and transition notification) (Step S101). The main CPU 12 causes the respective units of the first functional operation unit 13 to end operation and to be turned off (Step S102).

The main CPU 12 outputs an instruction to the main power supply control unit 11 to cause the switching element 112 to be turned off which switches power supply/power non-supply to the first functional operation unit 13 (Step S103) and after a lapse of a predetermined time, to cause the switching element 111 to be turned off which switches power supply/power non-supply to the main CPU 12 (Step S104). Then, the main CPU 12 executes stop processing of its own (Step S105) to end the low power mode transition processing.

The low power mode transition processing by the sub CPU 22 is started upon receiving, from the main CPU 12, a notification of a transition to the low power mode.

As shown in FIG. 2B, the sub CPU 22 waits for a predetermined time (Step S201), and thereafter causes the first switch 31 to be turned off (Step S202). The sub CPU 22 causes the sub power supply control unit 21 to turn off the switching element 213 which switches power supply/power non-supply to the first switch 31 (Step S203). Then, the sub CPU 22 ends the low power mode transition processing.

Figure 3A:
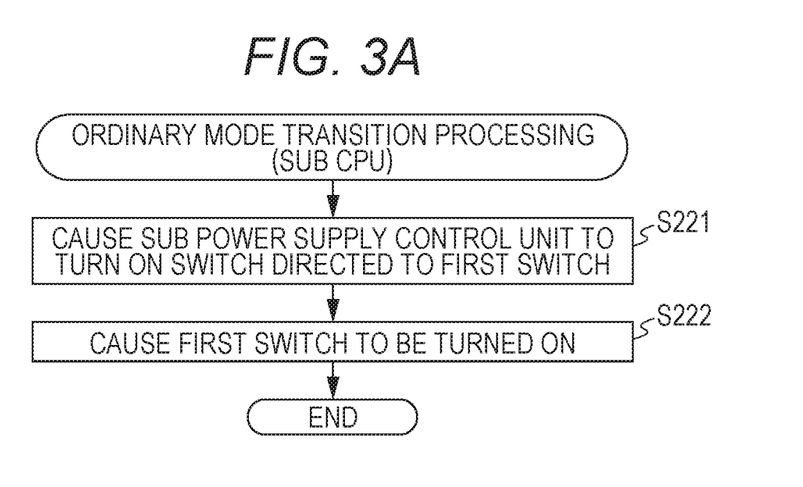
FIG. 3A is a flow chart showing a control procedure by the sub CPU in ordinary mode transition processing.
Figure 3B:
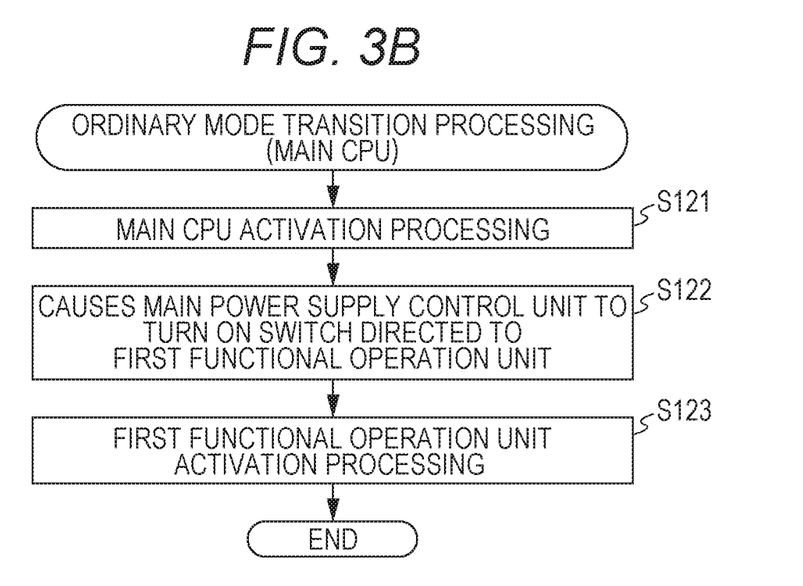
FIG. 3B is a flow chart showing a control procedure by the main CPU in the ordinary mode transition processing.

FIG. 3A is a flow chart showing a control procedure by the sub CPU 22 in ordinary mode transition processing executed in the electronic apparatus 100 of the present embodiment, and FIG. 3B is a flow chart showing a control procedure by the main CPU 12.

The ordinary mode transition processing by the sub CPU 22 is started when a predetermined condition is detected related to a transition of the sub CPU 22 to the ordinary mode.

As shown in FIG. 3A, the sub CPU 22 causes the sub power supply control unit 21 to turn on the switching element 213 which determines power supply/power non-supply to the first switch 31 (Step S221). Then, the sub CPU 22 causes the first switch 31 to be turned on (Step S222). Then, the sub CPU 22 ends the ordinary mode transition processing.

As described above, when upon turn-on of the first switch 31, power is supplied to the main power supply control unit 11 to activate the main power supply control unit 11, the switching element 111 is turned on which switches power supply/power non-supply to the main CPU 12 to supply power to the main CPU 12 as initial setting, so that the main CPU 12 is activated to execute various kinds of processing related to the ordinary mode.

The ordinary mode transition processing by the main CPU 12 is activated upon supply of power to the main CPU 12 to active the same as described above.

As shown in FIG. 3B, the main CPU 12 executes activation processing of its own (Step S121), and then, causes the main power supply control unit 11 to turn on the switching element 112 which determines power supply/power non-supply to the first functional operation unit 13 (Step S122). The main CPU 12 executes activation processing of the first functional operation unit 13 (Step S123) to end the ordinary mode transition processing.

Figure 4:
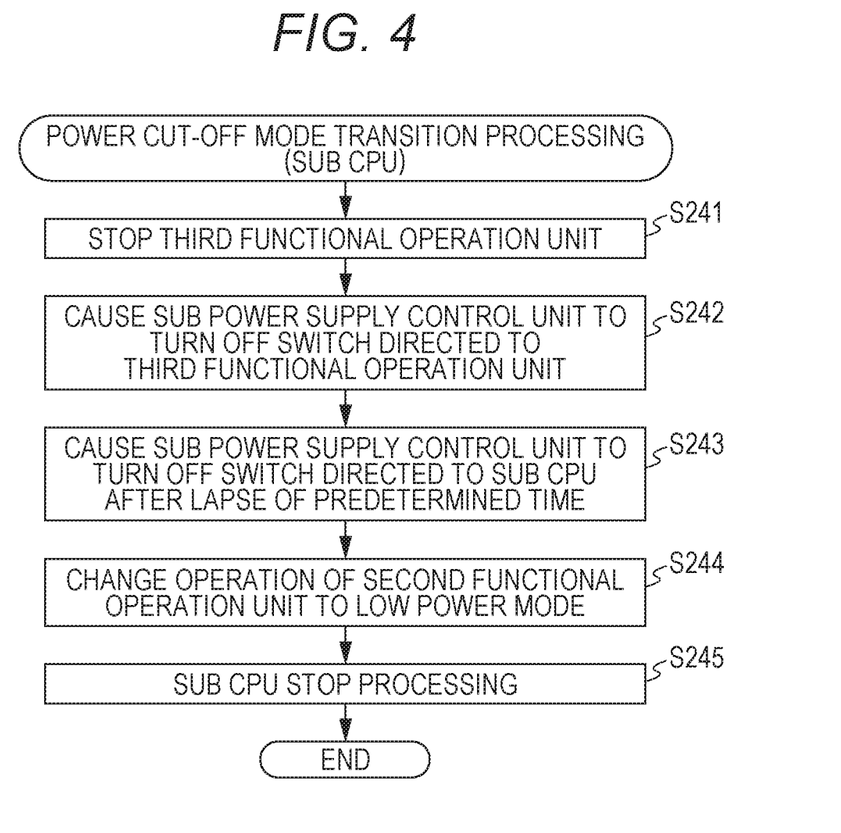
FIG. 4 is a flow chart showing a control procedure by the sub CPU in power cut-off mode transition processing.

FIG. 4 is a flow chart showing a control procedure by the sub CPU 22 in power cut-off mode transition processing executed in the electronic apparatus 100 of the present embodiment.

The power cut-off mode transition processing is started when an instruction to stop operation of the sub CPU 22 is further acquired in the low power mode.

The sub CPU 22 causes the third functional operation unit 23 to stop operation (Step S241). The sub CPU 22 causes the sub power supply control unit 21 to turn off the switching element 212 which switches power supply/power non-supply to the third functional operation unit 23 (Step S242). Additionally, the sub CPU 22 sends the control signal to the sub power supply control unit 21 to give an instruction to turn off the switching element 214 which switches power supply/power non-supply to the sub CPU 22 (a second stop and transition notification) after a lapse of a predetermined time (a predetermined shift time) (Step S243).

The sub CPU 22 causes the second functional operation unit 211 to have operation changed to the low power mode (a low power consumption operation state) (Step S244). The sub CPU 22 executes operation stop processing of its own (Step S245) to end the power cut-off mode transition processing.

As described in the foregoing, the electronic apparatus 100 of the present embodiment includes the main CPU 12, the main power supply control unit 11 which conducts power supply to the main CPU 12 and conducts supply control of the power, the sub power supply control unit 21 which conducts power supply to the main power supply control unit 11, and the first switch 31 which switches on and off power supply from the sub power supply control unit 21 to the main power supply control unit 11.

This enables switching of operation itself of the main power supply control unit 11 according to operation/non-operation of such a configuration to which power is supplied from the main power supply control unit 11 as the main CPU 12, so that power supply control can be conducted without increasing power consumption related to power supply control, i.e. can be conducted more efficiently in the electronic apparatus 100 than in a conventional apparatus.

Additionally, when the main CPU 12 is stopped, the first switch 31 is turned off to cut off a power supply from the sub power supply control unit 21 to the main power supply control unit 11.

At the time of thus stopping operation of the main CPU 12, since not only a power supply to the main CPU 12 is suspended but also a power supply to the main power supply control unit 11 which conducts control of power supply to the main CPU 12 is suspended by the first switch 31, conducting the power supply control by the sub power supply control unit 21 only for a configuration not requiring operation of the main CPU 12 enables reduction in power consumption of the main power supply control unit 11 according to the power consumption of the main CPU 12 or the like. Accordingly, more efficient power supply control can be conducted in the electronic apparatus 100 than in a conventional apparatus.

Additionally, since on/off of the first switch 31 is determined according to switching among a plurality of operation modes including the ordinary mode in which the main CPU 12 is operated and the stop mode in which the main CPU 12 is stopped, it is possible to easily and appropriately control operation of the main power supply control unit 11 and a power supply to the main power supply control unit 11 according to operation/non-operation of the main CPU 12 requiring large power consumption or an RAM operable in cooperation with the same, thereby efficiently improving power supply control.

Additionally, the electronic apparatus 100 includes a predetermined circuit part different from the main CPU 12 and operable upon receiving a power supply from the sub power supply control unit 21, which predetermined circuit part includes the sub CPU 22 that causes the first switch 31 to be turned on during operation of the main CPU 12 and to be turned off during a stop of the main CPU 12. Specifically, since the first switch 31 is switched between on and off by the sub CPU 22 of which power supply/power non-supply is controlled by the sub power supply control unit 21, appropriate switching operation of the first switch 31 is enabled with ease.

Additionally, at a transition to the stop mode, the main CPU 12 issues, to the sub CPU 22, the first stop and transition notification to the effect that a transition is to be made to the stop mode, and when acquiring the first stop and transition notification, the sub CPU 22 causes the first switch 31 to be turned off. Thus appropriately sending stop timing information itself from the main CPU 12 to the sub CPU 22 enables the sub CPU 22 to appropriately conduct processing related to switching of power supply to the main power supply control unit 11 with ease.

Additionally, the first functional operation unit 13 executing a predetermined function is provided, operation of which is controlled by the main CPU 12, and the main power supply control unit 11 cuts off a power supply to the first functional operation unit 13 at the time of stopping the main CPU 12. Specifically, since each unit controlled by the main CPU 12 in cooperation with the main CPU 12 also has a power supply/power non-supply thereof controlled in cooperation with the main CPU 12, an operation state of the electronic apparatus 100 can be efficiently determined while appropriately cutting wasteful power consumption without wasteful operation or having a weak current as a stand-by state.

Additionally, the switching elements 212, 214 are provided which switch on and off a power supply from the sub power supply control unit 21 to a predetermined circuit part other than the main CPU 12, the predetermined circuit part including the sub CPU 22, which sub CPU 22 causes the sub power supply control unit 21 to turn off the switching elements 212, 214 at the time of stopping operation of the sub CPU 22.

Specifically, since at the time of stopping the operation of the sub CPU 22, a power supply from the sub power supply control unit 21 to the sub CPU 22 is also cut, wasteful power consumption can be further reduced. Additionally, since a power supply to the third functional operation unit 23 operable in cooperation with the sub CPU 22 can be also cut in cooperation, the operation state of the electronic apparatus 100 can be more efficiently determined while cutting wasteful power consumption.

Additionally, at the time of stopping operation of the sub CPU 22, the sub CPU 22 outputs the second stop and transition notification related to a stop of the sub CPU 22 to the sub power supply control unit 21, and the sub power supply control unit 21 causes the switching elements 212, 214 to be turned off after a lapse of the predetermined shift time after acquiring the second stop and transition notification. Accordingly, since a power supply to the sub CPU 22 and the like is cut off after the stop processing of the sub CPU 22 and a peripheral device thereof is safely and reliably completed, switching of power supply/power non-supply can be appropriately conducted without causing a problem in the sub CPU 22 or in set data.

Additionally, the sub power supply control unit 21 has the second functional operation unit 211, and at the time of stopping operation of the sub CPU 22, the sub CPU 22 outputs, to the sub power supply control unit 21, the second stop and transition notification related to a stop of the sub CPU 22, so that after a lapse of the predetermined shift time after acquiring the second stop and transition notification, the sub power supply control unit 21 causes the second functional operation unit 211 to make a transition to the low power consumption operation state requiring smaller power consumption than in the ordinary operation.

Thus, irrespective of operation of the main CPU 12 or the sub CPU 22, limiting operation of a minimum required functional operation unit to operation with power consumption necessary for maintaining minimum operation while maintaining the unit in a state of allowing power supply enables further reduction in power consumption while appropriately maintaining operation of the second functional operation unit 211, i.e. operation of the electronic apparatus 100.

Additionally, at the time of stopping operation of the sub CPU 22, the sub CPU 22 causes the first switch 31 to be turned off.

Specifically, when at the time of inspection before shipment or the like, operation of the sub CPU 22 is to be stopped to completely stop the ordinary operation of the electronic apparatus 100, executing the stop operation together with turn-off operation of the first switch 31 results in more reliably cutting off a power supply to the main power supply control unit 11 and the respective units such as the main CPU 12 to which power is supplied from the main power supply control unit 11, so that the rechargeable battery 50 is prevented from consuming more power than is required during a long-term storage of a product stock.

Additionally, providing the first switch 31 in the sub power supply control unit 21 enables reduction in the number of parts to be assembled of the electronic apparatus 100 and enables the electronic apparatus 100 capable of more appropriate power supply control to be obtained with ease and reliably.

Additionally, using the above-described power supply control method in the electronic apparatus 100 enables power supply control to be conducted more efficiently than by a conventional method.

The present invention is not limited to the above-described embodiment and allows for various changes.

For example, although in the above embodiment, the sub CPU 22 is configured to control switching of the first switch 31, the first switch 31 may be turned off with a delay of a predetermined time after the main CPU 12 sends an instruction thereto, or may be switched between on and off in cooperation with user's operation of a predetermined push button switch.

Additionally, while the above embodiment is assumed that power supply control of all the functional operation units controlled by the main CPU 12 is conducted by the main power supply control unit 11, a unit operable independently of the main CPU 12 may be configured to have a power supply controlled by the sub power supply control unit 21 or to have power supplied from any unit.

Additionally, in the above embodiment, the ordinary mode and the stop mode are set according to operation and non-operation of the main CPU 12, other operation mode may be set by partly limiting operation of the first functional operation unit 13 while operating the main CPU 12. Additionally, in this case, when limiting an operation frequency of the main CPU 12 to reduce the operation frequency, power supply control may be enabled not from the main power supply control unit 11 but from the sub power supply control unit 21 to cause the first switch 31 to be turned off.

Additionally, although the above embodiment is assumed that when causing the sub CPU 22 to be turned off, operation of the second functional operation unit 211 is brought into a low power state, an operation condition of the second functional operation unit 211 may not be changed according to the operation of the sub CPU 22.

Additionally, although in the above embodiment, the switching element 214 directed to the sub CPU 22 is turned off with a predetermined delay from a reception of a notification related to a stop of the sub CPU 22, the switching element 214 may be turned off when a value of a current flowing through the switching element 214 becomes not more than a predetermined stand-by current value in place of conducting delay operation.

Other than the foregoing, specific details such as the configurations, control procedures and display examples can be appropriately changed without departing from the gist of the present invention.

Although the present invention has been described with respect to several embodiments, the scope of the present invention is not limited to the above-described embodiments and includes the scope of the invention recited in Claims and an equivalent scope thereof.

The invention claimed is:
1. An electronic apparatus comprising:
a first processor;
a first power supply circuit which conducts control of power supply to the first processor;
a second power supply circuit which conducts control of power supply to the first power supply circuit via a connecting line provided directly between the first and second power supply circuits; and
a first analog switch which selectively physically energizes or cuts off the connecting line which electrically connects the first power supply circuit and the second power supply circuit, so as to switch on and off the power supply from the second power supply circuit to the first power supply circuit, wherein when the first analog switch is turned on, the connecting line is physically energized so that the power supply from the second power supply circuit to the first power supply circuit is conducted via the first analog switch, and when the first analog switch is turned off, the connecting line is physically cut off so that the power supply from the second power supply circuit to the first power supply circuit is switched off, wherein on/off of the first analog switch is determined according to switching among a plurality of operation modes including an ordinary mode in which the first processor is operated and a stop mode in which the first processor is stopped, wherein the electronic apparatus further comprises a predetermined circuit part different from the first processor, the predetermined circuit part receiving a power supply from the second power supply circuit, and the predetermined circuit part including a second processor, wherein the second processor causes the first analog switch to be turned on when the first processor is in operation and causes the first analog switch to be turned off during a stop of the first processor, wherein at a transition to the stop mode, the first processor issues, to the second processor, a first stop and transition notification indicating that a transition is to be made to the stop mode, and wherein the second processor causes the first analog switch to be turned off when acquiring the first stop and transition notification.

2. The electronic apparatus according to claim 1, further comprising a first functional operation section, the first functional operation section receiving a power supply from the first power supply circuit and executing a predetermined function, and operation of the first functional operation section being controlled by the first processor, wherein the first power supply circuit cuts off a power supply to the first functional operation section at a time of stopping the first processor.

3. The electronic apparatus according to claim 1, further comprising:

a second analog switch which selectively switches on and off the power supply from the second power supply circuit to the predetermined circuit part, wherein at a time of stopping operation of the second processor, the second processor causes the second analog switch to be turned off by the second power supply circuit.

4. The electronic apparatus according to claim 3, wherein at the time of stopping operation of the second processor, the second processor outputs a second stop and transition notification related to a stop of the second processor to the second power supply circuit, and wherein the second power supply circuit causes the second analog switch to be turned off after a lapse of a predetermined shift time after acquiring the second stop and transition notification.

5. The electronic apparatus according to claim 3, wherein:

the second power supply circuit includes a second functional operation section which executes a predetermined function, at the time of stopping operation of the second processor, the second processor outputs a second stop and transition notification related to a stop of the second processor to the second power supply circuit, and the second power supply circuit causes the second functional operation section to make a transition to a low power consumption operation state requiring smaller power consumption than an ordinary operation state after a lapse of a predetermined shift time after acquiring the second stop and transition notification.

6. The electronic apparatus according to claim 3, wherein the second processor causes the first analog switch to be turned off at the time of stopping operation of the second processor.

7. The electronic apparatus according to claim 1, wherein the first analog switch is provided in the second power supply circuit.

8. A power supply control method of an electronic apparatus comprising a first processor; a first power supply circuit which conducts control of power supply to the first processor; a second power supply circuit which conducts control of power supply to the first power supply circuit via a connecting line provided directly between the first and second power supply circuits;

a predetermined circuit part different from the first processor, the predetermined circuit part receiving a power supply from the second power supply circuit, and the predetermined circuit part including a second processor; and an analog switch which selectively physically energizes or cuts off the connecting line which electrically connects the first power supply circuit and the second power supply circuit, so as to switch on and off the power supply from the second power supply circuit to the first power supply circuit, wherein when the analog switch is turned on, the connecting line is physically energized so that the power supply from the second power supply circuit to the first power supply circuit is conducted via the analog switch, and when the analog switch is turned off, the connecting line is physically cut off so that the power supply from the second power supply circuit to the first power supply circuit is switched off, wherein on/off of the analog switch is determined according to switching among a plurality of operation modes including an ordinary mode in which the first processor is operated and a stop mode in which the first processor is stopped, and wherein the second processor causes the first analog switch to be turned on when the first processor is in operation and causes the first analog switch to be turned off during a stop of the first processor, the method comprising:

at a transition to the stop mode, issuing by the first processor to the second processor a first stop and transition notification indicating that a transition is to be made to the stop mode; and by the second processor, acquiring the first stop and transition notification and causing the analog switch to be turned off so as to physically cut off the connecting line and cut off the power supply from the second power supply circuit to the first power supply circuit.

9. The electronic apparatus according to claim 1, further comprising a power source from which the second power supply circuit receives a supply of power, wherein all of the power supplied by the power source is input to the second power supply circuit, and then the second power supply circuit conducts control of the power supply to the first power supply circuit via the first analog switch.

* * * * *